United States Patent
Rangarajan Sridhar

(10) Patent No.: US 11,501,066 B2
(45) Date of Patent: *Nov. 15, 2022

(54) SYSTEM AND METHOD FOR UNSUPERVISED TEXT NORMALIZATION USING DISTRIBUTED REPRESENTATION OF WORDS

(71) Applicant: AT&T Intellectual Property I, L.P., Atlanta, GA (US)

(72) Inventor: Vivek Kumar Rangarajan Sridhar, Morristown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 226 days.

This patent is subject to a terminal disclaimer.

(21) Appl. No.: 16/889,609

(22) Filed: Jun. 1, 2020

(65) Prior Publication Data

US 2020/0293713 A1 Sep. 17, 2020

Related U.S. Application Data

(63) Continuation of application No. 16/139,192, filed on Sep. 24, 2018, now Pat. No. 10,671,807, which is a continuation of application No. 14/506,156, filed on Oct. 3, 2014, now Pat. No. 10,083,167.

(51) Int. Cl.
*G06F 40/232* (2020.01)
*G06F 40/58* (2020.01)
*G06Q 50/00* (2012.01)

(52) U.S. Cl.
CPC ............ *G06F 40/232* (2020.01); *G06F 40/58* (2020.01); *G06Q 50/01* (2013.01)

(58) Field of Classification Search
CPC .............................. G06F 40/232; G06F 40/58
See application file for complete search history.

(56) References Cited

U.S. PATENT DOCUMENTS 6,131,102 A * 10/2000 Potter ................... G06F 40/232
715/260
6,138,085 A 10/2000 Richardson et al.
(Continued)

OTHER PUBLICATIONS

Aw et al., "A phrase-based statistical model for SMS text normalization," *In Proceedings of the COLING/ACL*, 2006 Main Conference Poster Sessions, pp. 33-40, Sydney, Jul. 2006. © 2006 Association for Computational Linguistics.
(Continued)

*Primary Examiner* — Kevin Ky

(57) ABSTRACT

A system, method and computer-readable storage devices for providing unsupervised normalization of noisy text using distributed representation of words. The system receives, from a social media forum, a word having a non-canonical spelling in a first language. The system determines a context of the word in the social media forum, identifies the word in a vector space model, and selects an "n-best" vector paths in the vector space model, where the n-best vector paths are neighbors to the vector space path based on the context and the non-canonical spelling. The system can then select, based on a similarity cost, a best path from the n-best vector paths and identify a word associated with the best path as the canonical version.

20 Claims, 7 Drawing Sheets

(56) References Cited

U.S. PATENT DOCUMENTS

| | | | |
|---|---|---|---|
| 6,424,983 B1* | 7/2002 | Schabes | G06F 40/253 |
| | | | 707/999.005 |
| 7,249,012 B2 | 7/2007 | Moore | |
| 7,689,412 B2 | 3/2010 | Wu et al. | |
| 7,716,039 B1* | 5/2010 | Bangalore | G10L 15/193 |
| | | | 704/275 |
| 8,229,728 B2 | 7/2012 | Huang et al. | |
| 8,234,106 B2 | 7/2012 | Marcu et al. | |
| 8,285,728 B1 | 10/2012 | Rubin | |
| 8,515,739 B2 | 8/2013 | Godbole et al. | |
| 8,521,509 B2 | 8/2013 | Abir | |
| 10,083,167 B2* | 9/2018 | Rangarajan Sridhar | |
| | | | G06F 40/58 |
| 10,671,807 B2* | 6/2020 | Rangarajan Sridhar | |
| | | | G06F 40/58 |
| 2004/0107089 A1* | 6/2004 | Gross | G06Q 10/107 |
| | | | 704/10 |
| 2004/0128122 A1* | 7/2004 | Privault | G06F 40/289 |
| | | | 704/4 |
| 2008/0250357 A1* | 10/2008 | Lee | G06F 40/14 |
| | | | 715/853 |
| 2009/0192781 A1* | 7/2009 | Bangalore | G06F 40/45 |
| | | | 704/E13.008 |
| 2010/0131015 A1 | 5/2010 | Kozak | |
| 2010/0217596 A1* | 8/2010 | Morris | G10L 15/10 |
| | | | 704/E15.001 |
| 2011/0144992 A1 | 6/2011 | Toutanova et al. | |
| 2011/0270604 A1 | 11/2011 | Qi et al. | |
| 2011/0320191 A1 | 12/2011 | Makeyev | |
| 2012/0131015 A1* | 5/2012 | Al Badrashiny | G06F 40/253 |
| | | | 707/E17.084 |
| 2013/0046544 A1* | 2/2013 | Kay | G06F 3/023 |
| | | | 345/169 |
| 2013/0283156 A1* | 10/2013 | Al Badrashiny | G06F 40/232 |
| | | | 715/257 |
| 2014/0288915 A1* | 9/2014 | Madnani | G06F 40/58 |
| | | | 704/2 |
| 2015/0100515 A1* | 4/2015 | George | G06Q 10/067 |
| | | | 705/342 |
| 2020/0293713 A1* | 9/2020 | Rangarajan Sridhar | |
| | | | G06F 40/232 |
| 2021/0026461 A1* | 1/2021 | Hsu | G06F 3/0237 |

OTHER PUBLICATIONS

Beaufort et al., "A hybrid rule/model-based finite-state framework for normalizing SMS messages" *Proceedings of the 48th Annual Meeting of the Association for Computational Linguistics*, pp. 770-779, Uppsala, Sweden, Jul. 11-16, 2010. © 2010 Association for Computational Linguistics.

Bengio et al., "A neural probabilistic language model," *Journal of Machine Learning Research 3* (2003) 1137-1155. Submitted Apr. 2002; Published Feb. 2003. © 2003 Yoshua Bengio, Réjean Ducharme, Pascal Vincent, Christian Jauvin.

Bengio et al., "Curriculum learning," Published in Proceeding ICML'2009 *Proceedings of the 2th Annual International Conference on Machine Learning*, pp. 41-48. Montreal, Quebec, Canada, 2009-Jun. 14-18, 2009.

Brill et al., "An improved error model for noisy channel spelling correction," *Proceedings of the 38th Annual Meeting on Association for Computational Linguistics*, pp. 286-293. Publication date Oct. 3, 2000. Publisher: *Association for Computational Linguistics*.

Collobert et al., "A unified architecture for natural language processing: deep neural networks with multitask learning," *Proceedings of the 25th International Conference on Machine Learning*, p. 160-167. Publication date Jul. 5, 2008.

Collobert et al., "Torch7: A Matlab-like environment for machine learning," Conference paper, Published in NIPS 2011. Collobert_NIPSWORKSHOP_2011, book title: BigLearn, NIPS Workshop, 2011.

Cook et al., "An unsupervised model for text message normalization," *Proceedings of the NAACL HLT Workshop on Computational Approaches to Linguistic Creativity*, pp. 71-78. Boulder, Colorado, Jun. 2009. © 2009 Association for Computational Linguistics.

Han et al., "Automatically constructing a normalization dictionary for microblogs," *Proceedings of the 2012 Joint Conference on Empirical Methods in Natural Language Processing and Computational Natural Language Learning*, pp. 421-432, Jeju Island, Korea, Jul. 12-14, 2012. © 2012 Association for computational Linguistics.

Kobus et al., "Normalizing SMS: are two metaphors better than one?" *Proceedings of the 22nd International Conference on Computational Linguistics (Coling 2008)*, pp. 441-448, Manchester, Aug. 2008.

D. Melamed, "Automatic evaluation and uniform filter cascades for inducing n-best translation lexicons," *Proceedings of the Third Workshop on Very Large Corpora*, 15 pages. Published May 1995.

Mikolov et al., "Recurrent neural network based language model," In *Proceedings of Interspeech*, 2010. Copyright © 2010 ISCA. Sep. 26-30, 2010, Makuhari, Chiba, Japan.

Mikolov et al., "Efficient estimation of word representation in vector space," In *Proceedings of Workshop at ICLR*, Sep. 7, 2013.

L. Mironovschi, "Russian SMS compliments," *Written Language & Literacy*, vol. 10, Issue 1, Jan. 2007, pp. 53-63.

F.J. Och, "Minimum error rate training in statistical machine translation," *Proceedings of the 41st Annual Meeting of the Association for Computational Linguistics*, Jul. 2003, Sapporo, Japan, pp. 160-167.

Olivia et al., "A SMS normalization system integrating multiple grammatical resources," *Natural Language Engineering*, vol. 19, Issue 01, Jan. 2013, pp. 121-141. Copyright © Cambridge University Press 2012.

Owoputi et al., "Improved part-of-speech tagging for online conversational text with word clusters," *Proceedings of NAACL-HLT 2013*, pp. 380-390. Atlanta, GA, Jun. 9-14, 2013 © 2013 Association for Computational Linguistics.

L. Philips, "Hanging on the Metaphone," *Computer Language Magazine* 7 (12): 39-44 (Dec. 1990).

A. Ratnaparkhi, "A maximum entropy model for part-of-speech tagging," *Proceedings of EMNLP*. Published in EMNLP 1996. Booktitle "Conference on Empirical Methods in Natural Language Processing", year 1996, https://www.aclweb.org/anthology/W96-0213.

J. Roth-Gordon, "Youth, slang, and pragmatic expressions: Examples from Brazilian Portuguese," Article first published online: Jun. 6, 2007, *Journal of Sociolinguistics*, vol. 11, Issue 3, pp. 322-345.

Ruiz et al., "Lexical normalization of Spanish tweets with preprocessing rules, domain-specific edit distances, and language models," Proceedings of the *Tweet Normalization Workshop at SEPLN 2013. IV Congreso Espanol de Informatica*, Sep. 2013, Madrid, Spain. HAL-01099250.

Tiedemann et al., "The OPUS corpus—parallel & free," Proceedings of the Fourth International Conference on Language Resources and Evaluation (LREC'2004), May 2004 p. 93-96.

Toutanova et al., "Pronunciation modeling for improved spelling correction," *Proceedings of the 40th Annual Meeting of the Association for Computational Linguistics (ACL)*, Philadelphia, Jul. 2002, pp. 141-151.

Turian et al., "Word representations: a simple and general method for semi-supervised learning," *Proceedings of the 48th Annual Meeting of the Association for Computational Linguistics*, pp. 384-394, Uppsala, Sweden, Jul. 11-16, 2010. © 2010 Association for Computational Linguistics.

Zhang et al., "Learning a Phrase-based Translation Model from Monolingual Data with Application to Domain Adaptation," *Proceedings of the 51st Annual Meeting of the Association for Computational Linguistics (ACL)*, Sofia, Bulgaria, Aug. 4-9, 2013, pp. 1425-1434.

Han et al., "Lexical normalization for social media text," *ACM Transactions on Intelligent Systems and Technology (TIST)*, New York, vol. 4, Issue 1, Article 5, Jan. 2013.

(56) References Cited

OTHER PUBLICATIONS

Hassan et al., "Social Text Normalization using Contextual Graph Random Walks," *Proceedings of the 51st Annual Meeting of the Association for Computational Linguistics (ACL)*, Sofia, Bulgaria, Aug. 4-9, 2013, pp. 1577-1586.

Li et al., "Improving Text Normalization via Unsupervised Model and Discriminative Reranking," *Proceedings of the ACL 2014 Student Research Workshop*, Baltimore, Maryland, Jun. 22-27, 2014, pp. 86-93.

\* cited by examiner

SYSTEM AND METHOD FOR UNSUPERVISED TEXT NORMALIZATION USING DISTRIBUTED REPRESENTATION OF WORDS

PRIORITY INFORMATION

The present application is a continuation of U.S. patent application Ser. No. 16/139,192, filed Sep. 24, 2018, which is a continuation of U.S. patent application Ser. No. 14/506, 156, filed Oct. 3, 2014, now U.S. Pat. No. 10,083,167, issued Sep. 25, 2018, the contents of which are incorporated herein by reference in their entirety.

BACKGROUND

1. Technical Field

The present disclosure relates to text normalization and more specifically to normalization of text in the context of social media translations.

2. Introduction

Text normalization is a prerequisite for a variety of tasks involving speech and language. Most natural language processing (NLP) tasks require a tight and compact vocabulary to reduce the model complexity in terms of feature size. As a consequence, applications such as syntactic, semantic tagging, named entity extraction, information extraction, machine translation, language models for speech recognition, etc., are trained using clean, normalized, data restricted by a user defined vocabulary.

Conventionally, most NLP researchers perform such normalization through rule-based mapping that can get unwieldy and cumbersome for extremely noisy texts as in SMS, chat, or social media. Unnormalized text, as witnessed in social media forums such as Facebook, Twitter, and message boards, or SMS, have a variety of issues with spelling such as repeating letters, eliminating vowels, using phonetic spellings, substituting letters (typically syllables) with numbers, using shorthand, and user created abbreviations for phrases. A remarkable property of such texts is that new variants of canonical words and phrases are evolving constantly.

DETAILED DESCRIPTION

Figure 1:
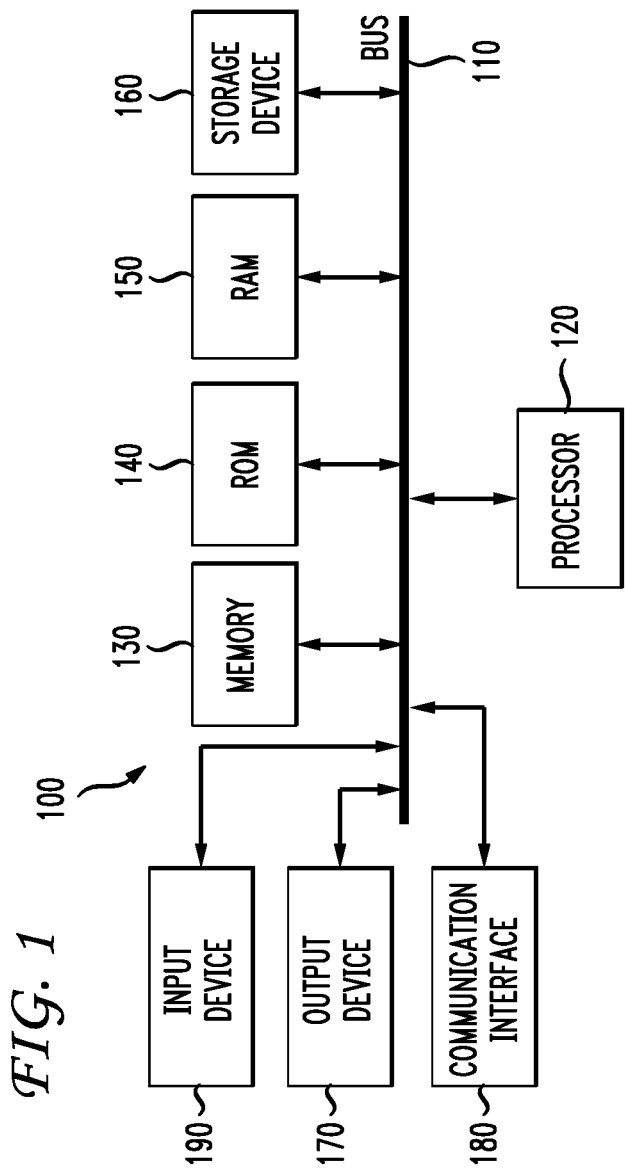
FIG. 1 illustrates an example system embodiment.

A system, method and computer-readable storage devices are disclosed which provide for unsupervised normalization of noisy text using a distributed representation of words. As an example, consider a system configured according to this disclosure receiving, from a social media forum, a word having a non-canonical spelling in a first language. The system determines a context of the word in the social media forum, identifies the word in a vector space model, to yield a vector space path, and selects n-best vector paths in the vector space model, where the n-best vector paths are neighbors to the vector space path based on the context and the non-canonical spelling. The system can then select, based on a similarity cost, a best path from the n-best vector paths and identify a word associated with the best path as a canonical version. When the word is not found in the vector space model, the system can create a modified vector space model by adding the word to the vector space model.

Such a system uses distributional similarity in induced word representations (obtained either through neural networks (non-linear embeddings) or linear models (linear embeddings)) to construct normalization lexicons in a completely unsupervised manner. Once the normalization lexicon is learned, finite-state transducers perform the normalization. This approach is language independent and can be applied to normalizing customer care notes and social media, such as Twitter and Facebook. The same approach can be applied to phrase normalization lexicons by training distributed representations over compound words, where instead of a single word being normalized, an entire phrase/ multiple words are being normalized. The concept of phrase normalization leads to the normalizing/translating of social media texts (Facebook posts or tweets) appropriately, i.e., should one translate "ilu" (I love you) in English to "te quiero" or "tq" in Spanish? "Te quiero" and "tq" could both be appropriate translations for distinct situations. For example, the system could use "tq" when the receiving user uses many abbreviations, whereas "te quiero" could be used if the receiving user never uses abbreviations.

The disclosed approach is language agnostic and can use the property of contextual similarity between canonical and noisy versions of a particular word to cluster them in $R^D$, where D is the dimension of the distributed representation R. Compound words can be obtained from a speech recognition application designed for SMS. The distributed representation can be induced either through deep neural networks (non-linear embeddings) or linear models (linear embeddings). The distributed representation R can then be used in translating social media text using the disclosed framework, e.g., should one translate lol in English to rire aux éclats, mort de rire, or mdrrr in French?

Conventional NLP applications typically use discrete representation of words, i.e., one-hot encoding where each word in the vocabulary is represented by a bit vector. Such a representation exacerbates the data sparsity problem and does not exploit any semantic or syntactic relationship that may be present amongst subset of words. In the recent past, distributed representation of words (also called word embeddings or continuous space representation of words) has become a popular way for capturing distributional similarity (lexical, semantic or even syntactic) between words. The basic idea is to represent each word in vocabulary V with a real-valued vector of some fixed dimension D, i.e., $w_i \in R^D \forall i=1, \ldots, V$, where $\forall$ represents universal quantification (i.e., for all, or for any).

Distributed representations can be induced for a given vocabulary V in several ways. While they are typically induced in the context of a deep neural network framework for a given task they can also be induced by using simple linear models. In many practical NLP applications, distributed representations are identified along with the task (generatively or discriminatively), and the word vectors can have some distributional similarity that is task dependent. For example, in a binary sentiment classification task, words representing positive sentiment will be closer in the vector space ($R^D$) and away from the words denoting negative sentiment. Similarly, in a language model task, words that share similar context can have vector representations that are closer. It is this notion of contextual and distributional similarity that we exploit to learn normalization lexicons in an unsupervised manner.

Various embodiments of the disclosure are described in detail below. While specific implementations are described, it should be understood that this is done for illustration purposes only. Other components and configurations may be used without parting from the spirit and scope of the disclosure.

The present disclosure addresses unsupervised text normalization using distributed representation of words. A brief introductory description of a basic general purpose system or computing device in FIG. 1 which can be employed to practice the concepts, methods, and techniques disclosed is illustrated. A more detailed description of unsupervised text normalization, as well as embodiments and variations will then follow. These variations shall be described herein as the various embodiments are set forth. The disclosure now turns to FIG. 1.

With reference to FIG. 1, an exemplary system and/or computing device 100 includes a processing unit (CPU or processor) 120 and a system bus 110 that couples various system components including the system memory 130 such as read only memory (ROM) 140 and random access memory (RAM) 150 to the processor 120. The system 100 can include a cache 122 of high-speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various operations or actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the processor. The processor 120 may be a self-contained computing system, containing multiple cores or processors, a bus, memory controller, cache, etc. A multi-core processor may be symmetric or asymmetric. The processor 120 can include multiple processors, such as a system having multiple, physically separate processors in different sockets, or a system having multiple processor cores on a single physical chip. Similarly, the processor 120 can include multiple distributed processors located in multiple separate computing devices, but working together such as via a communications network. Multiple processors or processor cores can share resources such as memory 130 or the cache 122, or can operate using independent resources. The processor 120 can include one or more of a state machine, an application specific integrated circuit (ASIC), or a programmable gate array (PGA) including a field PGA.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 160 can include software modules 162, 164, 166 for controlling the processor 120. The system 100 can include other hardware or software modules. The storage device 160 is connected to the system bus 110 by a drive interface. The drives and the associated computer-readable storage devices provide nonvolatile storage of computer-readable instructions, data structures, program modules and other data for the computing device 100. In one aspect, a hardware module that performs a particular function includes the software component stored in a tangible computer-readable storage device in connection with the necessary hardware components, such as the processor 120, bus 110, display 170, and so forth, to carry out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the device 100 is a small, handheld computing device, a desktop computer, or a computer server. When the processor 120 executes instructions to perform "operations", the processor 120 can perform the operations directly and/or facilitate, direct, or cooperate with another device or component to perform the operations.

Although the exemplary embodiment(s) described herein employs the hard disk 160, other types of computer-readable storage devices which can store data that are accessible by a computer, such as magnetic cassettes, flash memory cards, digital versatile disks (DVDs), cartridges, random access memories (RAMs) 150, read only memory (ROM) 140, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations described below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage devices. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored in other computer-readable memory locations.

One or more parts of the example computing device 100, up to and including the entire computing device 100, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 120 can include all types of processors disclosed herein, including a virtual processor. However, when referring to a virtual processor, the processor 120 includes the software components associated with executing the virtual processor in a virtualization layer and underlying hardware necessary to execute the virtualization layer. The system 100 can include a physical or virtual processor 120 that receive instructions stored in a computer-readable storage device, which cause the processor 120 to perform certain operations. When referring to a virtual processor 120, the system also includes the underlying physical hardware executing the virtual processor 120.

Figure 2:
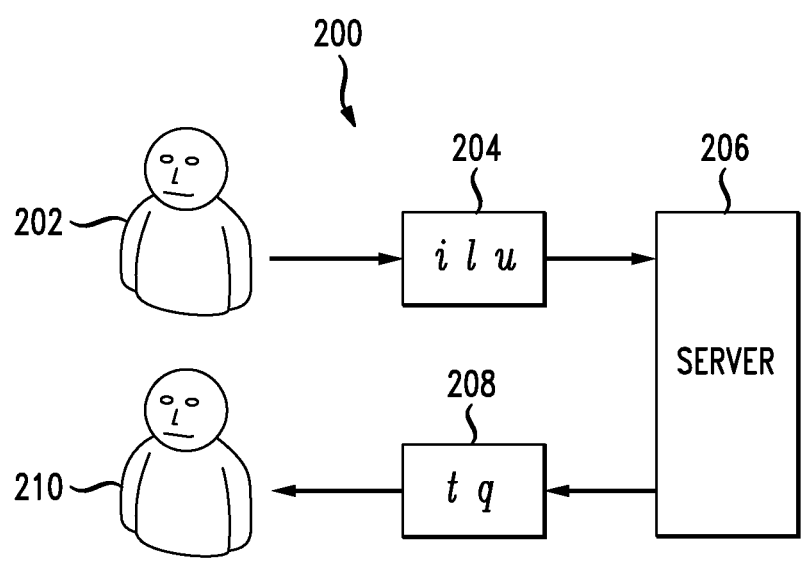
FIG. 2 illustrates an example of normalizing social media input.

Having disclosed some components of a computing system, the disclosure now turns to FIG. 2, which illustrates an example 200 of normalizing social media input. In this example 200, the server 206 is configured according to this disclosure and performs text normalization using distributed representation of words. A first user 202 sends a message 204 (such as a tweet, a social media post, a text message, or other message). In this example, the message of the user 202 is "i/u," an abbreviation for "I love you." "I love you" can be translated from English into Spanish in at least two ways: "Te amo" and "Te quiero." The server 206 receives the message 204 and determines a meaning and context of the message. In this case, the server 206 identifies the "ilu" 204 as an abbreviation and determines the full phrase. Using a distributed representation of words, the server 206 can identify (1) the correct translation is "te quiero" and (2) that for a current circumstance an output of "tq" 208 (an abbreviated form of "te quiero") is the best translation of "ilu" to output.

A second user 210 then receives the "tq" 208. If the initial message 204 were a social media message, such as a Tweet using Twitter, the initial message 204 could be simultaneously translated to many different languages using similar steps for each language. For example, rather than translating the message 202 to Spanish, as illustrated, the message could be translated to Spanish, Russian, and Chinese. Such translations can occur serially (Spanish, then Russian, then Chinese) or in parallel. In addition, while an abbreviated form (such as "tq") can be identified as appropriate for one language, a full translation (such as "te quiero") can be identified in a distinct language. Determinations as to full versus abbreviated, or what translation best applies, can be based on the content and context of the message, as well on as the identity/attributes of the users, types of social media being used for the messages, etc.

Figure 3:
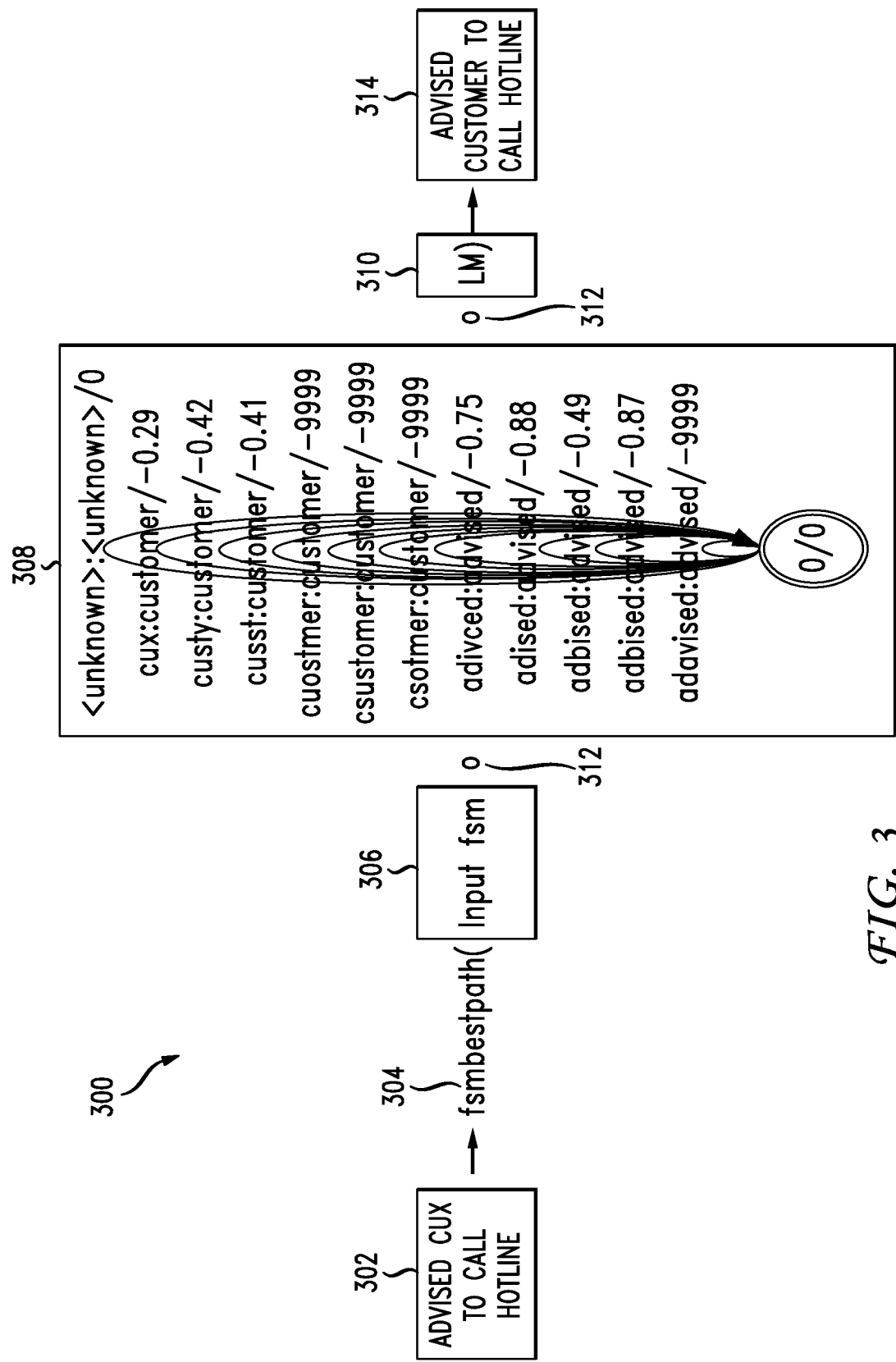
FIG. 3 illustrates a normalization technique using finite state transducers.

FIG. 3 illustrates a normalization technique using finite state transducers. The illustrated technique is performed upon obtaining distributed representations for all words in training data and defining a cost metric that describes the fidelity between a canonical and noisy form of a word. In order to score the normalizations induced through the distributed representations, we use a combination of cosine metric and lexical similarity cost. The cosine distance between two D-dimensional vectors u and v is defined as, $$\text{cosine similarity} = \frac{\sum_{i=1}^{D} u_i \times v_i}{\sqrt{\sum_{i=1}^{D} (u_i)^2 \times \sum_{i=1}^{D} (v_i)^2}} \quad \text{Equation (1)}$$

Given two strings s1 and s2, the lexical similarity cost is defined as, $$\text{lexical similarity}(s1, s2) = \frac{LCSR(s1, s2)}{ED(s1, s2)} \quad \text{Equation (2)}$$

$$LCSR(s1, s2) = \frac{LCS(s1, s2)}{\text{MaxLength}(s1, s2)} \quad \text{Equation (3)}$$

where LCSR refers to the Longest Common Subsequence Ratio, LCS refers to Longest Common Subsequence and ED refers to the edit distance between the two strings. For English, the edit distance computation can be modified to find the distance between the consonant skeleton of the two strings s1 and s2, i.e., all the vowels are removed. Repetition in the strings was reduced to a single letter and numbers in the words can be substituted by their equivalent letters. The general algorithm for learning a normalization lexicon through this approach is presented in Algorithm 1. This algorithm is exemplary, and can be modified or otherwise changed as required by specific configurations.

---

Algorithm 1:

Inputs:
input $\{v_i\}_{i=1}^{|V|}$: distributed representation of words for vocabulary |V|
input K: number of nearest neighbors
input COST: lexical similarity metric
input W: list of canonical words
input C: list of clean words in a language
Operation:
for each w ∈ W do
  for each I ∈ |V| do
    if w' → $v_i$ ∉ C and W then
      Compute cosine distance between vi and v(w)
      Store top K neighbors in map L(w)
for each w ∈ W do
  for each o ∈ L(w) do
    Compute COST(w,o)
    Push w → {o, COST(w,o)} into D
Invert the map D to obtain lexicon L.

---

Compiling the lexicon L obtained using Algorithm 1 (or a similar algorithm) into a finite-state transducer with the arc score equal to the exponent of the negative similarity cost (for finding the path with least cost). The normalization lexicon is converted into a single state finite-state transducer (FST) with the input and output labels being the noisy and canonical word, respectively. Given a sentence that needs to be normalized, the system can form a linear FSM s from the text string and compose it with the FST lexicon N. The resulting FSM is then composed with a language model (LM) L constructed from the clean vocabulary sentences and the best path is found that results in the normalized output $s_{norm}$.

$$s_{norm} = \text{bestpath}(s \circ N \circ L) \quad \text{Equation (4):}$$

where "o" represents a standard composition function.

The example 300 of FIG. 3 performs the composition by first receiving "noisy" text 302, where at least one word has a non-canonical spelling. In this case, the non-canonical word is "cux." The system searches for the best path using the "fsmbestpath" 304 equation noted in Equation (4). As inputs to the function 304, the system provides a finite state machine 306 based on the text string 302, and composes the finite state machine 306 with a finite state transducer 308 and a language model 310. The compositions 312 apply each input to each vector in the finite state transducer 308 and each entry in the language model 310. The output 314 of the best path function 304 illustrated indicates the most likely same-language interpretation 314 of the text, where "cux" was interpreted to mean "customer." In other configurations, such as a translation, the output 314 can be in foreign languages and/or include abbreviations, additional words, etc., to express the same ideas, concepts, and contexts of the original message 302.

Figure 4:
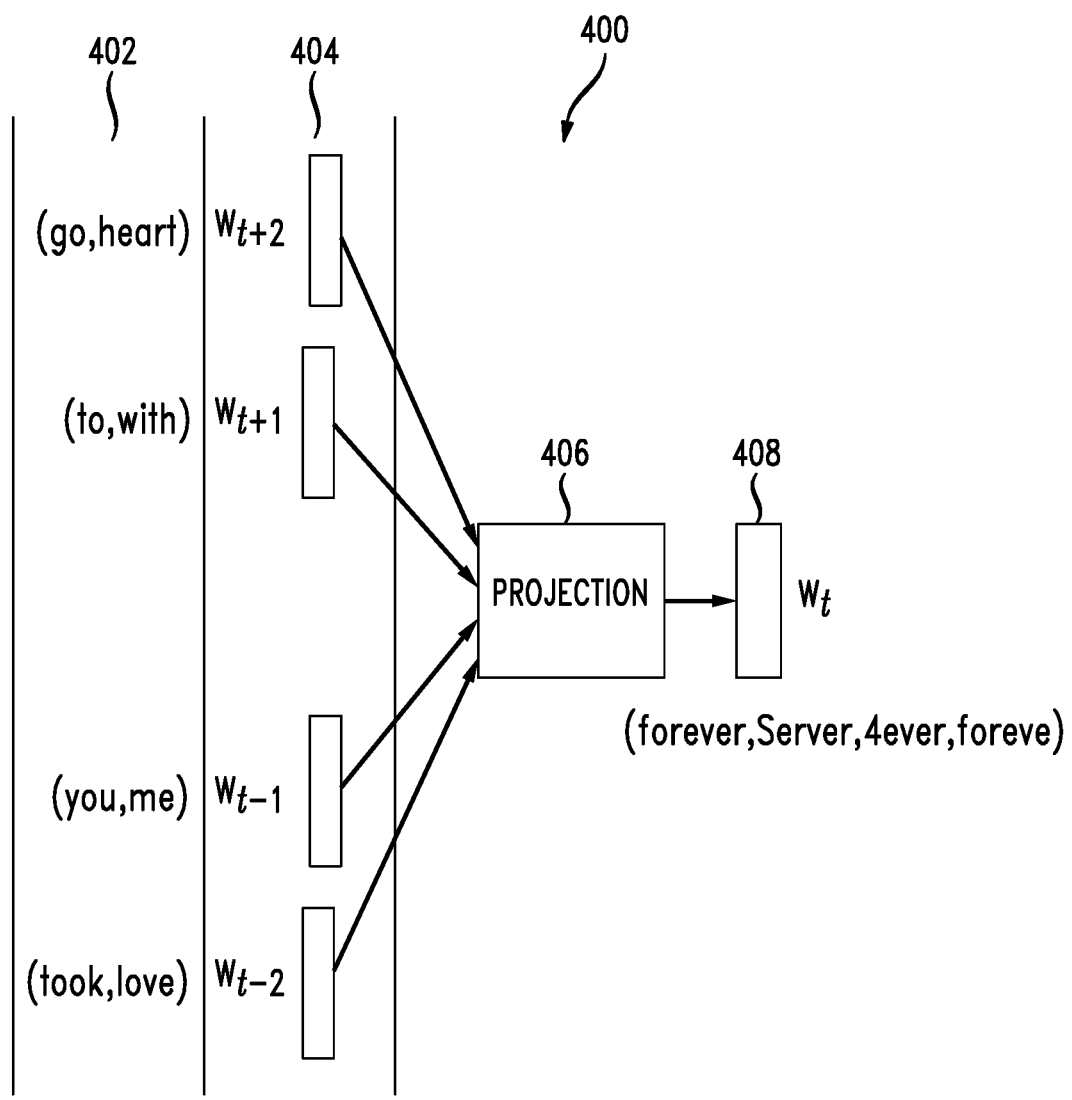
FIG. 4 illustrates a continuous bag-of-words architecture.

FIG. 4 illustrates a continuous bag-of-words architecture 400 which can be used for determining a distributed representation of words. The network consists of a lookup table 302, a sum pooling layer 404, and a cross-entropy based loss function 406, resulting in a distribution representation 408 based on a context of words. This architecture 400 can use any of the features of a neural network architecture, as described in FIG. 5.

Figure 5:
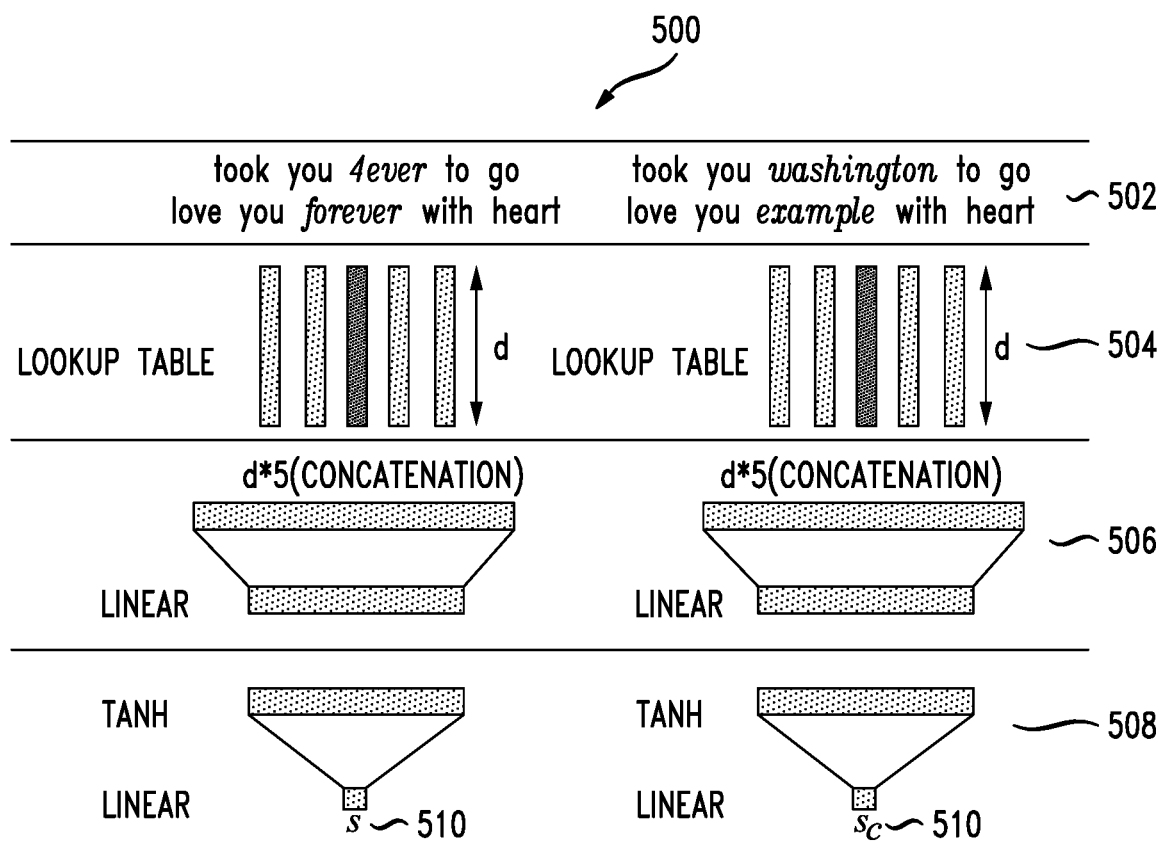
FIG. 5 illustrates a deep neural network architecture.

FIG. 5 illustrates a deep neural network architecture 500 which can, in place of or in conjunction with the continuous bag-of-words architecture. The network consists of a lookup table 504, a hidden layer 506 with a number of nodes, and a linear layer 508 with one output 510. However, a context of words and a corrupted center word instead of the last word can be used to learn the distributed representations. Given a text window 502 s={w}$_1^{wlen}$, wlen is the window length, and a set of parameters associated with the network θ, the network outputs a score $f_θ(x)$. The approach then minimizes the ranking criterion with respect to θ such that:

$$\theta \rightarrow \Sigma_{s \in X} \Sigma_{w \in V} \max\{0, 1 - f_\theta(s) + f_\theta(s_c^{(w)})\} \quad \text{Equation 5:}$$

where X is the set of all windows of length wlen in the training data, V is the vocabulary, and $s_c$ denotes the corrupted version of s with the middle word replaced by a random word w in V. A frequency threshold can be used (for example, 10 occurrences for the center word, with higher, lower, or variable frequencies) to eliminate words from the representation. For example, all words below this frequency might not considered in training, and therefore not be in the distributed representation. An example of a variable frequency could be requiring a higher frequency for words of a particular type or context, or based on the total number of words (i.e., the required frequency is 10 if the total training data is 1000 words, whereas the required frequency is 25 if the total training data is 30,000 words, the frequency required being linear or non-linear with respect to total training data). This type of function can be referred to as a margin ranking function.

Figure 6:
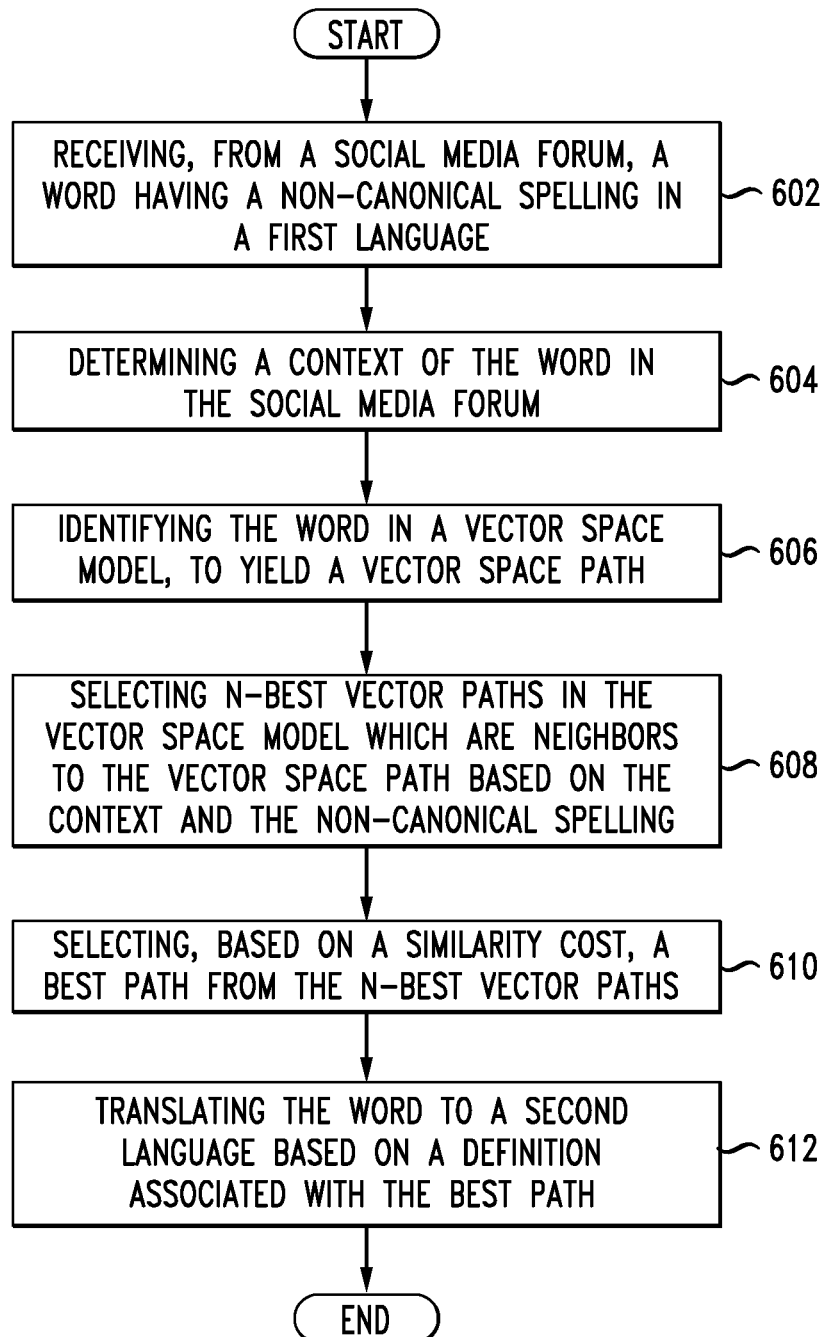
FIG. 6 illustrates an example method embodiment.

Having disclosed some basic system components and concepts, the disclosure now turns to the exemplary method embodiment shown in FIG. 6. For the sake of clarity, the method is described in terms of an exemplary system 100 as shown in FIG. 1 configured to practice the method. The steps outlined herein are exemplary and can be implemented in any combination thereof, including combinations that exclude, add, or modify certain steps.

A system 100 configured according to this disclosure can receive, from a social media forum, a word having a non-canonical spelling in a first language (602). For example, the word can be misspelled, abbreviated, written in a slang form, or combined with other words in a non-standardized way. The system 100 can determine a context of the word in the social media forum (604), or can identify other contexts in which the word is likely to be used. The system 100 can also identify the word in a vector space model (606), to yield a vector space path. In doing so, the system 100 can select n-best vector paths in the vector space model which are neighbors to the vector space path based on the context and the non-canonical spelling (608). Exemplary neighbors include other vectors which are similar to the size, lettering, context, or other attributes of the word. For example, "lol" can be used in a similar context to "laugh out loud," and therefore be considered neighbors of one another. However, "lol" can also be neighbors with "lob" and "Lola." The system 100 could identify and select "laugh out loud," "lob," and "Lola" as the n-best vector paths from the vector space model.

The system 100 can then select, based on a similarity cost, a best path from the n-best vector paths (610). The similarity cost can use context, previous usage, user preferences, age, profession, type of social media (i.e., Twitter post versus group text message), spelling, character length, etc., to determine which words or phrases are most similar to the received word. Using the best path, the system 100 can translate the word to a second language based on a definition associated with the best path (612). Exemplary languages which can be used include English, Spanish, German, Japanese, Korean, French, and Chinese. While the system 100 can translate the word into the other language using a similar format (such as abbreviation to abbreviation), the system 100 can also determine if having a similar format is the best option for the current circumstances. For example, the system 100 can evaluate if the other language has taboos against certain abbreviations, words, combinations, usages, contexts, etc., and determine the appropriate translation accordingly.

In addition, when the word is not found in the vector space model, the system 100 can create a modified vector space model by adding the word to the vector space model. If a context or usage is identified which was not previously associated with a word, the vector space model can be updated to account for the newly identified context or usage. It follows that the word can be classified within the vector space model, and the modified vector space model, based on context and/or spelling (including the non-canonical spelling).

The word can be a "simple" word, a compound word, a phrase, or any combination thereof. Examples of non-canonical spellings include abbreviations, misspellings, alternative spellings, foreign spellings, etc. How the word is classified in the modified vector space model can be based on the context and the type of non-canonical spelling. Finite-state transducers can perform the selecting of the n-best vector paths and the selecting of the best path.

Figure 7:
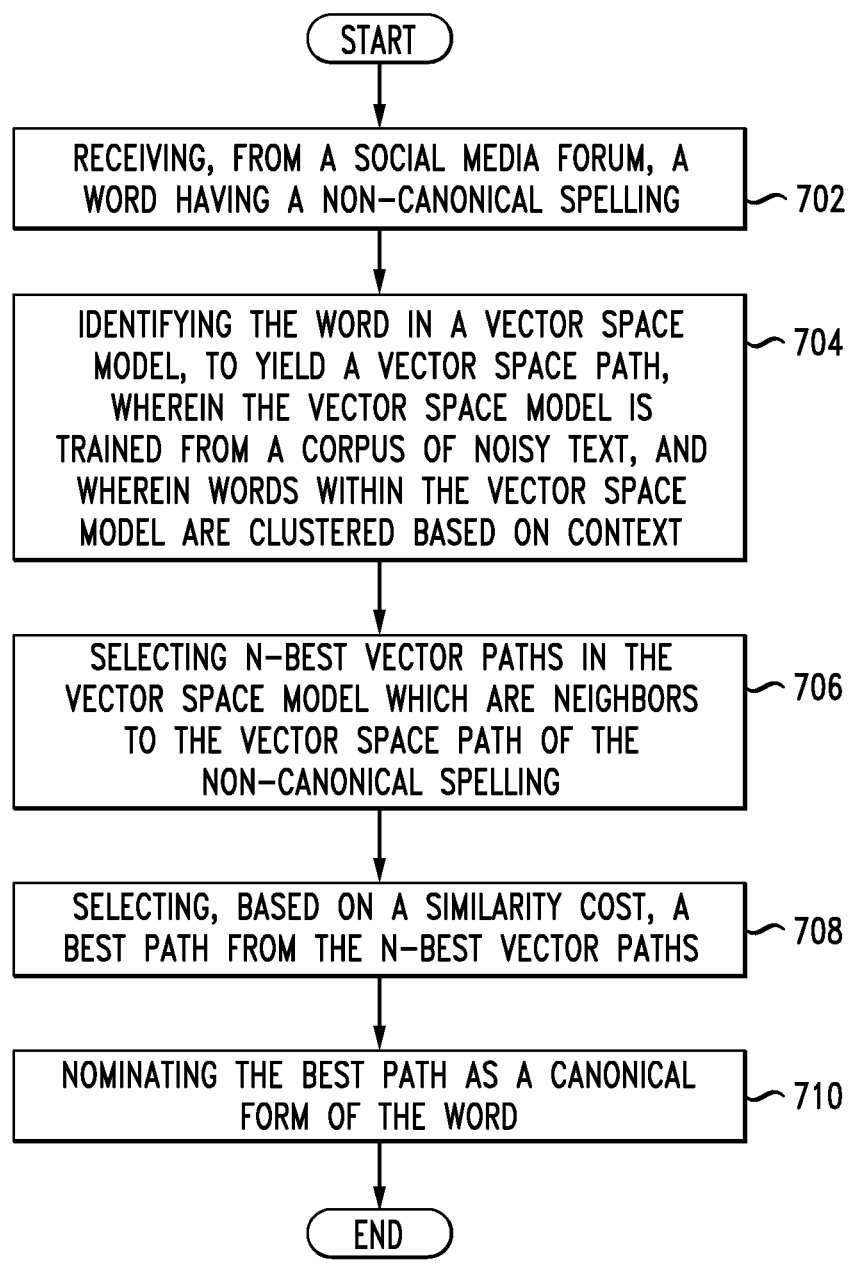
FIG. 7 illustrates a second example method embodiment.

FIG. 7 illustrates a second exemplary method embodiment. For the sake of clarity, the method is described in terms of an exemplary system 100 as shown in FIG. 1 configured to practice the method. The steps outlined herein are exemplary and can be implemented in any combination thereof, including combinations that exclude, add, or modify certain steps. In this example, the system 100 receives, from a social media forum, a word having a non-canonical spelling (702). Exemplary social media forums include a Facebook post, a Twitter tweet, a blog, or the comments of a newspaper article. The system 100 identifies the word in a vector space model, to yield a vector space path, where the vector space model is trained from a corpus of noisy text, and where the words within the vector space model are clustered based on context (704). Examples of "noisy text" can include social media forums, user comments, or any other location where non-canonized speech can be located. The system 100 can then select n-best vector paths in the vector space model which are neighbors to the vector space path of the non-canonical spelling (706). A best path from the n-best vector paths can be selected based on a similarity cost (708), and the best path can be nominated as a canonical form of the word (710). In this manner the system 100 can learn to perform improved text normalization in an unsupervised fashion.

Embodiments within the scope of the present disclosure may also include tangible and/or non-transitory computer-readable storage devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply generally to unsupervised normalization of noisy text, and can be used with or without social media. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

I claim:

1. A method comprising:
composing a correctly-spelled word finite state machine with a finite state transducer, wherein the finite state transducer comprises a vector space model trained from a corpus of noisy text, and wherein words within the finite state transducer are clustered based on context, to yield a modified finite state machine;
receiving a correctly-spelled word having a non-canonical spelling, the non-canonical spelling comprising a correct spelling of a variant of a canonical spelling of the correctly-spelled word;
processing the correctly-spelled word via the modified finite state machine to yield a proposed word; and outputting the proposed word as a canonical form of the correctly-spelled word, the proposed word determined according to a best path through the modified finite state machine.

2. The method of claim 1, further comprising:
performing a best path function on the modified finite state machine, wherein the best path function comprises:
selecting n-best vector paths in a vector space model which are neighbors to the non-canonical spelling; and
selecting, based on a similarity cost, the best path from the n-best vector paths.

3. The method of claim 2, wherein the similarity cost is based on a type of the non-canonical spelling.

4. The method of claim 3, wherein the type of the non-canonical spelling is an abbreviation.

5. The method of claim 1, wherein the correctly-spelled word is classified in the finite state transducer based on a word context and the non-canonical spelling.

6. The method of claim 1, wherein the correctly-spelled word comprises a compound word.

7. The method of claim 1, wherein the outputting the proposed word is performed as part of a translation from a first language to a second language.

8. A system comprising:
a processor; and
a computer-readable storage device storing instructions which, when executed by the processor, cause the processor to perform operations, the operations comprising:
composing a correctly-spelled word finite state machine with a finite state transducer, wherein the finite state transducer comprises a vector space model trained from a corpus of noisy text, and wherein words within the finite state transducer are clustered based on context, to yield a modified finite state machine;
receiving a correctly-spelled word having a non-canonical spelling, the non-canonical spelling comprising a correct spelling of a variant of a canonical spelling of the correctly-spelled word;
processing the correctly-spelled word via the modified finite state machine to yield a proposed word; and
outputting the proposed word as a canonical form of the correctly-spelled word, the proposed word determined according to a best path through the modified finite state machine.

9. The system of claim 8, wherein the computer-readable storage device stores additional instructions which, when executed by the processor, cause the processor to perform operations further comprising:
performing a best path function on the modified finite state machine, wherein the best path function comprises:
selecting n-best vector paths in a vector space model which are neighbors to the non-canonical spelling; and
selecting, based on a similarity cost, the best path from the n-best vector paths.

10. The system of claim 9, wherein the similarity cost is based on a type of the non-canonical spelling.

11. The system of claim 10, wherein the type of the non-canonical spelling is an abbreviation.

12. The system of claim 8, wherein the correctly-spelled word is classified in the finite state transducer based on a word context and the non-canonical spelling.

13. The system of claim 8, wherein the correctly-spelled word comprises a compound word.

14. The system of claim 8, wherein the outputting the proposed word is performed as part of a translation from a first language to a second language.

15. A method comprising:
receiving a correctly-spelled word having a non-canonical spelling, the non-canonical spelling comprising a correct spelling of a variant of a canonical spelling of the correctly-spelled word;
processing the correctly-spelled word via a modified finite state machine to yield a proposed word, wherein the modified finite state machine is generated by composing a correctly-spelled word finite state machine with a finite state transducer, the finite state transducer comprising a vector space model trained from a corpus of noisy text, and wherein words within the finite state transducer are clustered based on context; and
outputting the proposed word as a canonical form of the correctly-spelled word, the proposed word determined according to a best path through the modified finite state machine.

16. The method of claim 15, further comprising:
performing a best path function on the modified finite state machine, wherein the best path function comprises:
selecting n-best vector paths in a vector space model which are neighbors to the non-canonical spelling; and
selecting, based on a similarity cost, the best path from the n-best vector paths.

17. The method of claim 16, wherein the similarity cost is based on a type of the non-canonical spelling.

18. The method of claim 15, wherein the correctly-spelled word is classified in the finite state transducer based on a word context and the non-canonical spelling.

19. The method of claim 15, wherein the correctly-spelled word comprises a compound word.

20. The method of claim 15, wherein the outputting the proposed word is performed as part of a translation from a first language to a second language.

* * * * *